(12) United States Patent
Kabe (10) Patent No.: US 12,454,177 B2
(45) Date of Patent: Oct. 28, 2025

(54) TRANSAXLE

(71) Applicant: TOYOTA JIDOSHA KABUSHIKI KAISHA, Toyota (JP)

(72) Inventor: Yoshihiko Kabe, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/912,605

(22) Filed: Oct. 11, 2024

(65) Prior Publication Data

US 2025/0242687 A1 Jul. 31, 2025

(30) Foreign Application Priority Data

Jan. 30, 2024 (JP) .................................. 2024-011838

(51) Int. Cl.
*B60K 17/10* (2006.01)
(52) U.S. Cl.
CPC ................................. *B60K 17/105* (2013.01)
(58) Field of Classification Search
CPC ... B60K 17/00; B60K 17/105; B60Y 2306/01
See application file for complete search history.

(56) References Cited

U.S. PATENT DOCUMENTS 5,277,270 A * 1/1994 Hasegawa .............. B60K 17/00
74/606 R

FOREIGN PATENT DOCUMENTS

EP 1661771 A1 * 5/2006 ............. B60K 37/06
JP 2020045981 A * 3/2020

* cited by examiner

*Primary Examiner* — Abiy Teka
(74) *Attorney, Agent, or Firm* — SoraIP, Inc.

(57) ABSTRACT

The transaxle houses at least the rotating electrical machine and the gear in the case. The case of the transaxle includes a first boss portion protruding toward the vehicle member side and provided upward side, and a second boss portion protruding toward the vehicle member side and provided downward side, on a surface on which the vehicle member bent under the collision load abuts, and the vehicle member abuts against the upper portion of the first boss portion or the second boss portion before the lower portion of the second boss portion.

2 Claims, 6 Drawing Sheets

TRANSAXLE

CROSS-REFERENCE TO RELATED APPLICATION

This application claims priority to Japanese Patent Application No. 2024-011838 filed on Jan. 30, 2024, incorporated herein by reference in its entirety.

BACKGROUND

1. Technical Field

The present disclosure relates to a transaxle.

2. Description of Related Art

Japanese Unexamined Patent Application Publication No. 2020-045981 (JP 2020-045981 A) discloses a transaxle which is highly robust regarding collisions and which can suppress cracks from occurring in a cover thereof. In the transaxle disclosed in JP 2020-045981 A, ribs for restraining contact of a front side member are provided on an outer face thereof in a lattice shape.

SUMMARY

Now, space conservation in a unit including a transaxle is being studied. When ribs are provided, such as in the transaxle disclosed in JP 2020-045981 A described above, the ribs take up space, and space conservation becomes difficult.

The present disclosure has been made in view of such circumstances, and provides a transaxle that is capable of conserving space and of suppressing cracking of the case.

A transaxle according to the present disclosure is
a transaxle in which at least a rotating electrical machine and a gear are housed in a case, the case including, on a face that a vehicle member bent under a collision load abuts,
a first boss portion protruding toward a side of the vehicle member, and provided on an upward side, and
a second boss portion protruding toward the side of the vehicle member, and provided on a downward side, in which
the vehicle member abuts the first boss portion or an upper portion of the second boss portion before a lower portion of the second boss portion.

In the transaxle according to the present disclosure, the vehicle member abuts the first boss portion or the upper portion of the second boss portion before abutting the lower portion of the second boss portion. Accordingly, the transaxle according to the present disclosure is capable of conservation of space and also suppressing cracking of the case.

The first boss portion may protrude further toward the side of the vehicle member than the second boss portion does. Such a configuration also enables space to be conserved and cracking of the case to be suppressed.

At least a part of the upper portion of the second boss portion may protrude further than the lower portion does. Such a configuration also enables space to be conserved and cracking of the case to be suppressed.

The second boss portion may be tapered such that, the closer to the upward side, the farther the second boss portion protrudes. Such a configuration also enables space to be conserved and cracking of the case to be suppressed.

A transaxle according to the present disclosure is
a transaxle in which at least a rotating electrical machine and a gear are housed in a case, the case including
a boss portion provided on a downward side on a face that a vehicle member bent under a collision load abuts, protruding toward a side of the vehicle member, and
a relieving portion for relieving impact by being pressed in by the vehicle member when the vehicle member abuts the boss portion.

In the transaxle according to the present disclosure, when the vehicle member abuts the boss portion, the impact is relieved by being pushed in by the vehicle member. Accordingly, the transaxle according to the present disclosure is capable of conservation of space and also suppressing cracking of the case.

According to the present disclosure, a transaxle can be provided that is capable of conservation of space and also suppressing cracking of a case.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through embodiments of the disclosure, but the disclosure according to the claims is not limited to the following embodiments. Further, not all of the configurations described in the embodiments are essential as means for solving the problem. For clarity of explanation, the following description and the drawings are omitted and simplified as appropriate. In the drawings, the same elements are denoted by the same reference numerals, and redundant descriptions are omitted as necessary. It should be understood that the right-hand system xyz Cartesian coordinates illustrated in the drawings are for convenience of describing the positional relation of the constituent elements. Usually, the positive z-axis is vertically upward and xy plane is a horizontal plane.

Embodiment 1

Transaxle According to Comparative Example

Figure 1:
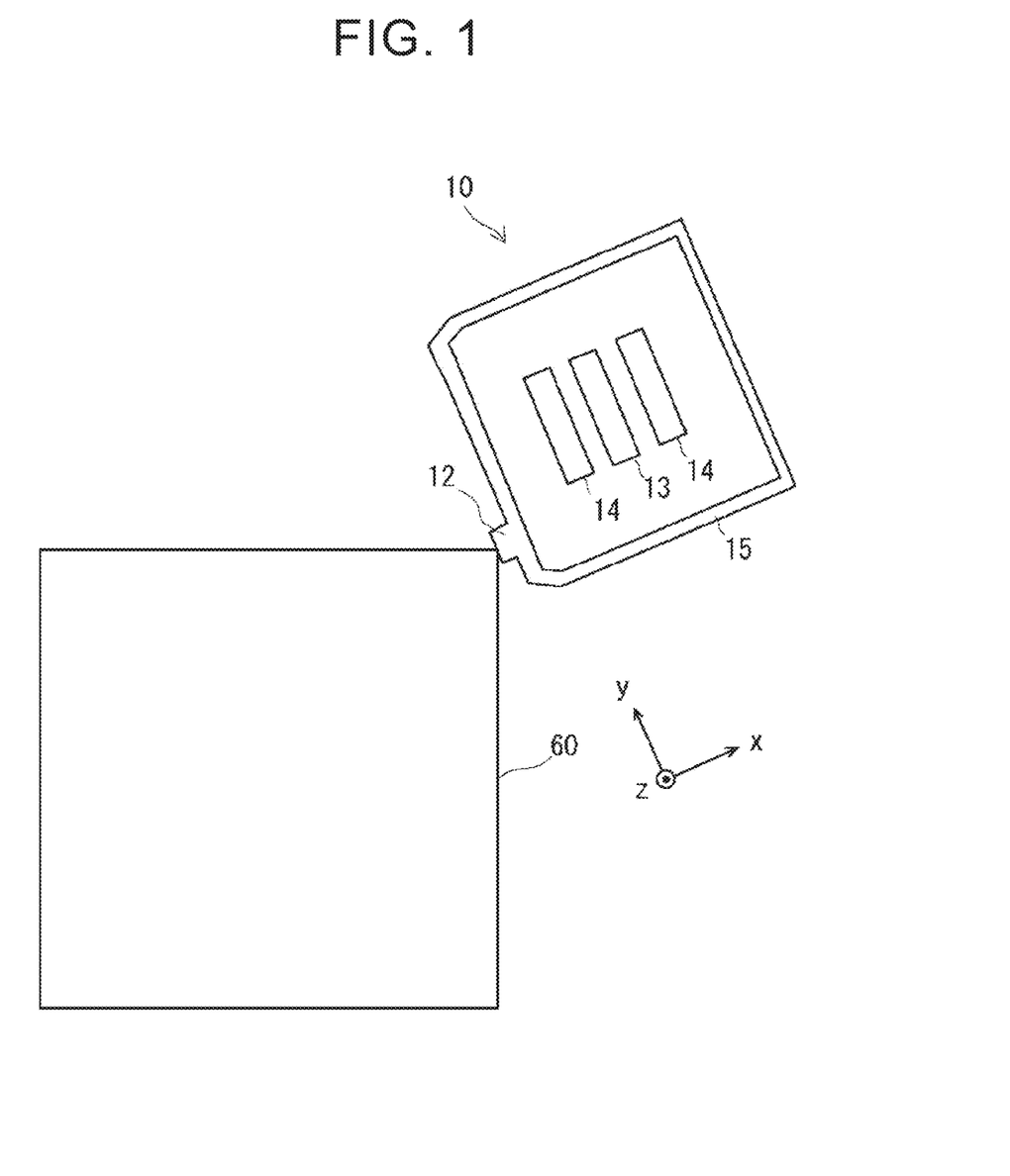
FIG. 1 is a view illustrating an abutting state of a transaxle and a vehicle member in a collision of a vehicle.
Figure 2:
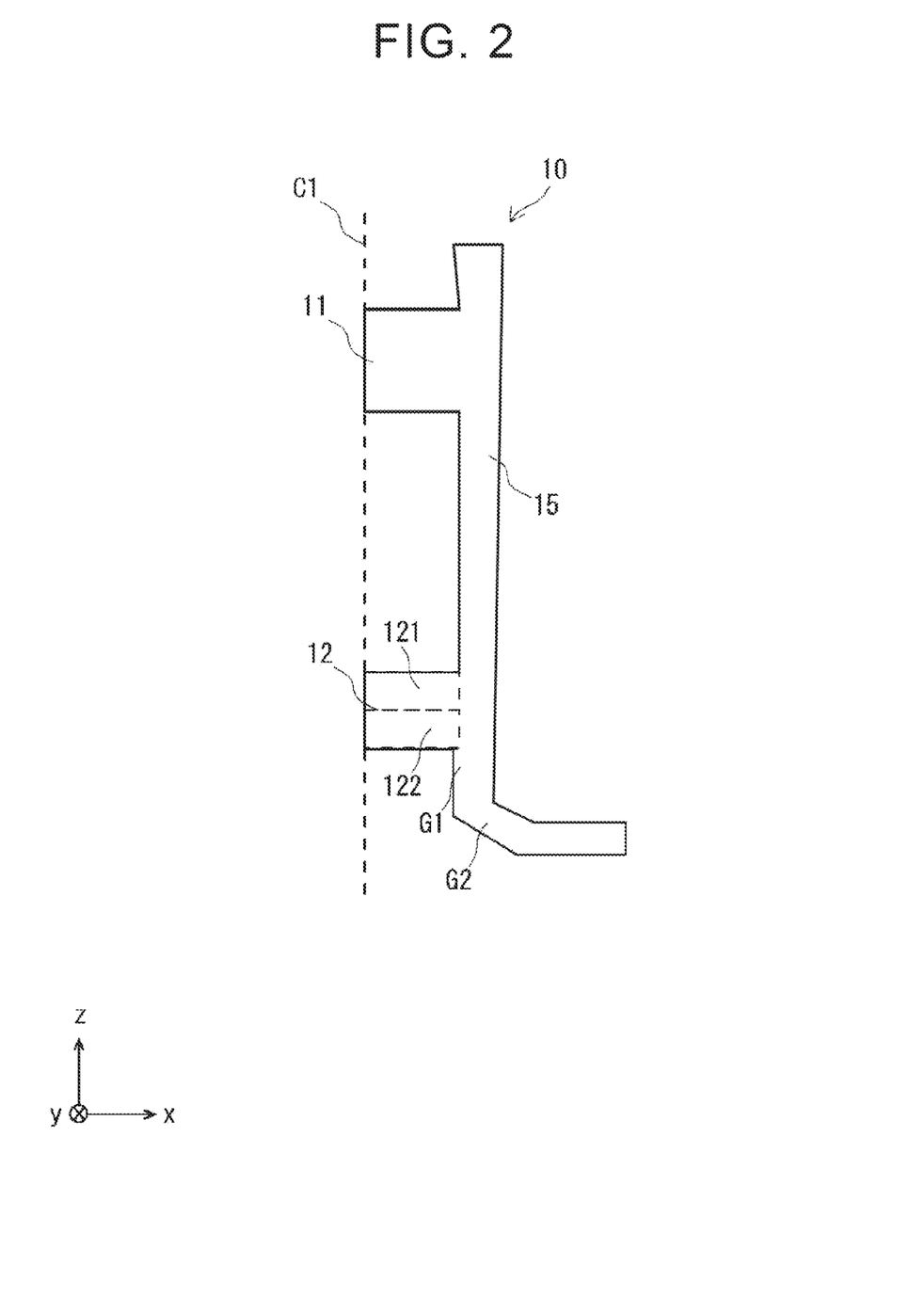
FIG. 2 is a view showing a part of a case of a transaxle according to a comparative example.

First, a transaxle according to a comparative example will be described with reference to FIGS. 1 and 2. FIG. 1 is a diagram illustrating a state of abutting between a transaxle and a vehicle member when a vehicle collides. FIG. 2 is a diagram illustrating a part of a case of a transaxle according to a comparative example. In FIGS. 1 and 2, the positive direction of the z-axis corresponds to the upward side, and the negative direction of the z-axis corresponds to the downward side. In FIG. 1, each side of the case 15 of the transaxle 10 is provided so as to be parallel to the x-axis or the y-axis.

The abutting state between the transaxle and the vehicle member when the vehicle collides will be described. As shown in FIG. 1, when the vehicle is subjected to a collision load, the vehicle member 60 bends and abuts against the transaxle 10. The vehicle member 60 is, for example, a front side member. In this way, when the vehicle collides, the case 15 of the transaxle 10 is broken, and thus the safety is insufficient. The abutting point between the transaxle 10 and the vehicle member 60 will be described later.

A transaxle according to a comparative example will be described. As shown in FIG. 1, the transaxle 10 houses at least the rotating electrical machine 13 and the gear 14 in the case 15. In the example illustrated in FIG. 1, the transaxle 10 includes one rotating electrical machine 13 and two gears 14.

A boss portion of the transaxle 10 according to the comparative example will be described with reference to FIG. 2. The case 15 of the transaxle 10 includes a first boss portion 11 and a second boss portion 12. The first boss portion 11 protrudes toward the vehicle member 60 side and is provided upward side (on the positive z-axis direction side) on a surface on which the vehicle member 60 bent under the collision load abuts. The second boss portion 12 protrudes toward the vehicle member 60 side and is provided downward side (on the z-axis negative direction side) on a surface on which the vehicle member 60 bent under the collision load abuts.

Further, the first boss portion 11 and the second boss portion 12 have the same length protruding from the case 15. More specifically, as shown in FIG. 2, both the distal end portion of the first boss portion 11 and the distal end portion of the second boss portion are located on the reference line C1.

The location where the transaxle 10 and the vehicle member 60 abut with each other when the vehicle collides will be described. As illustrated in FIG. 1, the vehicle member 60 is located on the vehicle front side (the x-axis negative direction side and the y-axis negative direction side) relative to the transaxle 10. Thus, when the vehicle collides, as shown in FIG. 1, the first boss portion 11 and the second boss portion 12 abut with the vehicle member 60.

Here, referring to FIG. 2, the stiffness of the root portion G1 and the corner portion G2 of the transaxle 10 will be described. The root portion G1 is a root portion of the second boss portion 12. The corner portion G2 is a corner portion on the second boss portion 12 side in the case 15. The root portion G1 has low stiffness and is highly deformed during impact. The corner portion G2 has high stiffness and is less deformed during impact.

Therefore, when the lower portion 122 of the second boss portion 12 shown in FIG. 2 abuts against the vehicle member 60, the stress is concentrated on the lower portion 122 of the second boss portion 12 rather than the upper portion 121 of the second boss portion 12. Then, stresses are concentrated on the root portion G1. As a result, the case 15 is broken.

Note that the upper portion 121 of the second boss portion 12 indicates the z-axis positive direction side with respect to the center of the second boss portion in the z-axis direction. The lower portion 122 of the second boss portion 12 indicates the z-axis negative direction side with respect to the center of the second boss portion in the z-axis direction. The same applies to the upper portion and the lower portion of the second boss portion 12, which will be described later.

As described above, the transaxle 10 according to the comparative example includes the first boss portion 11 and the second boss portion 12 having the same length protruding from the case 15. In the transaxle 10 according to the comparative example, since the stress is concentrated on the lower portion 122 of the second boss portion 12, the case 15 is broken.

Transaxle

Figure 3:
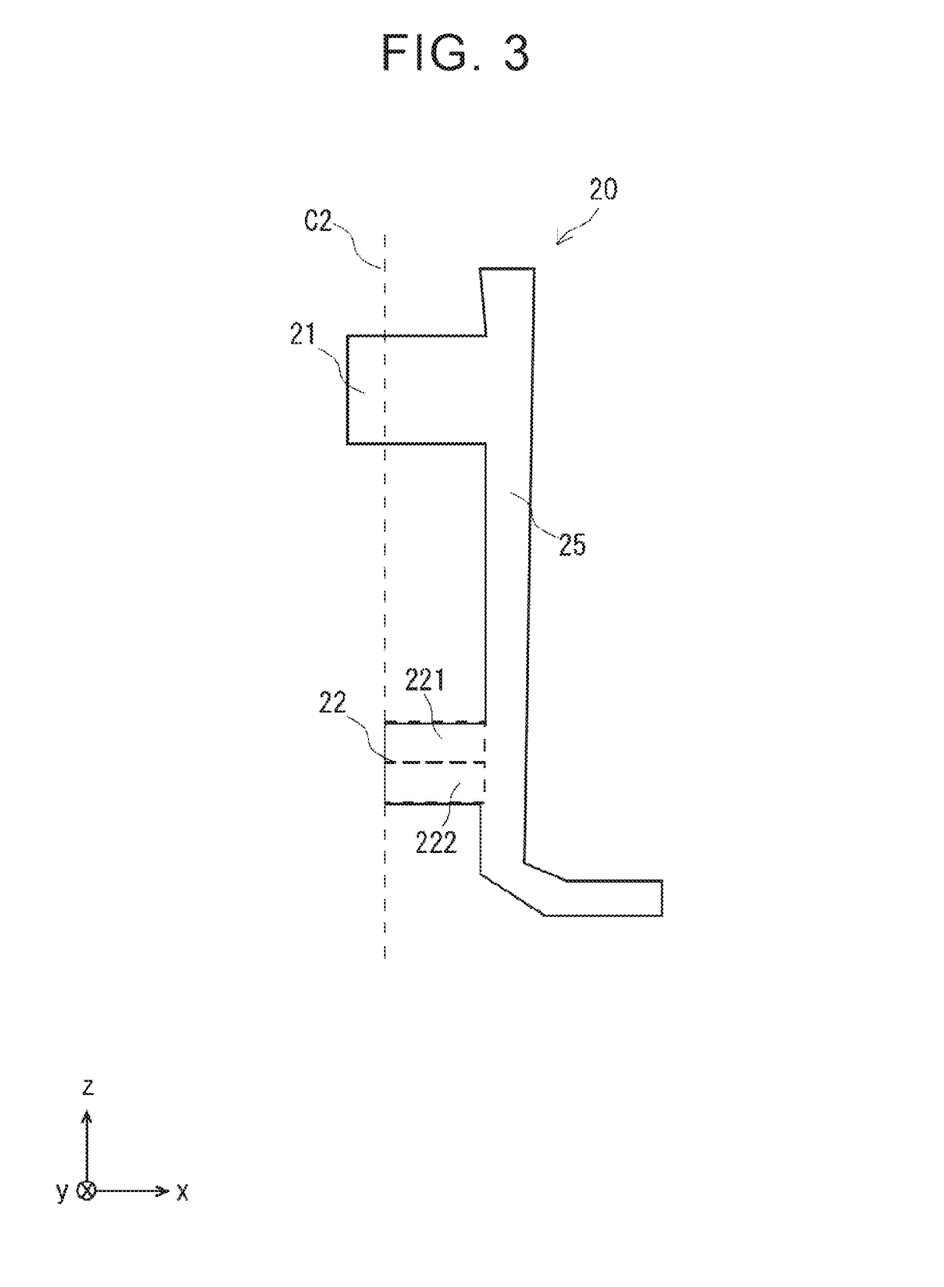
FIG. 3 is a diagram illustrating a part of a case of a transaxle according to Embodiment 1.

Next, the transaxle according to the first embodiment will be described. FIG. 3 is a diagram illustrating a part of a case of the transaxle according to the first embodiment. Although not shown in FIG. 3, the transaxle 20 according to the first embodiment houses at least the rotating electrical machine 13 and the gear 14 in the case 15, similarly to the transaxle 10 according to the comparative example shown in FIG. 1.

The boss portion of the transaxle according to the first embodiment will be described with reference to FIG. 3. The case 25 of the transaxle 20 includes a first boss portion 21 and a second boss portion 22. The first boss portion 21 protrudes toward the vehicle member 60 side and is provided upward side (on the positive z-axis direction side) on a surface on which the vehicle member 60 bent under the collision load abuts. The second boss portion 22 protrudes toward the vehicle member 60 side and is provided downward side (on the z-axis negative direction side) on a surface on which the vehicle member 60 bent under the collision load abuts.

Further, the first boss portion 21 and the second boss portion 22 have different lengths protruding from the case 15. More specifically, as shown in FIG. 3, the distal end portion of the first boss portion 21 is located closer to the negative x-axis direction than the reference line C2. On the other hand, the distal end portion of the second boss portion 22 is located on the reference line C2. As described above, in the transaxle 20, the length of the first boss portion 21 protruding from the case 15 is longer than the length of the second boss portion 22 protruding from the case 15. In other words, the first boss portion 21 protrudes closer to the vehicle member 60 than the second boss portion 22.

The location where the transaxle 20 and the vehicle member 60 abut with each other when the vehicle collides will be described. As shown in FIG. 3, since the first boss portion 21 protrudes toward the vehicle member 60 side from the second boss portion 22, the vehicle member 60 abuts the first boss portion 21 before the lower portion 222 of the second boss portion 22. As a result, the stress at the time of collision of the vehicle is dispersed in the first boss portion 21 and the second boss portion 22. Therefore, it is possible to prevent the stress from concentrating on the lower portion 222 of the second boss portion 22, and thus it is possible to prevent the case 25 from being broken.

Further, in the transaxle 20, since the case 25 includes the first boss portion 21 and the second boss portion 22, there is no need to provide a collision prevention material such as a rib outside the transaxle 20. Therefore, the transaxle 20 can save space and suppress cracking of the case.

As described above, in the transaxle 20, the first boss portion 21 protrudes closer to the vehicle member 60 than the second boss portion 22. Accordingly, since the vehicle member 60 abuts the first boss portion 21 before the lower portion 222 of the second boss portion 22, it is possible to save space and suppress cracking of the case.

Transaxle According to a Modification

Figure 4:
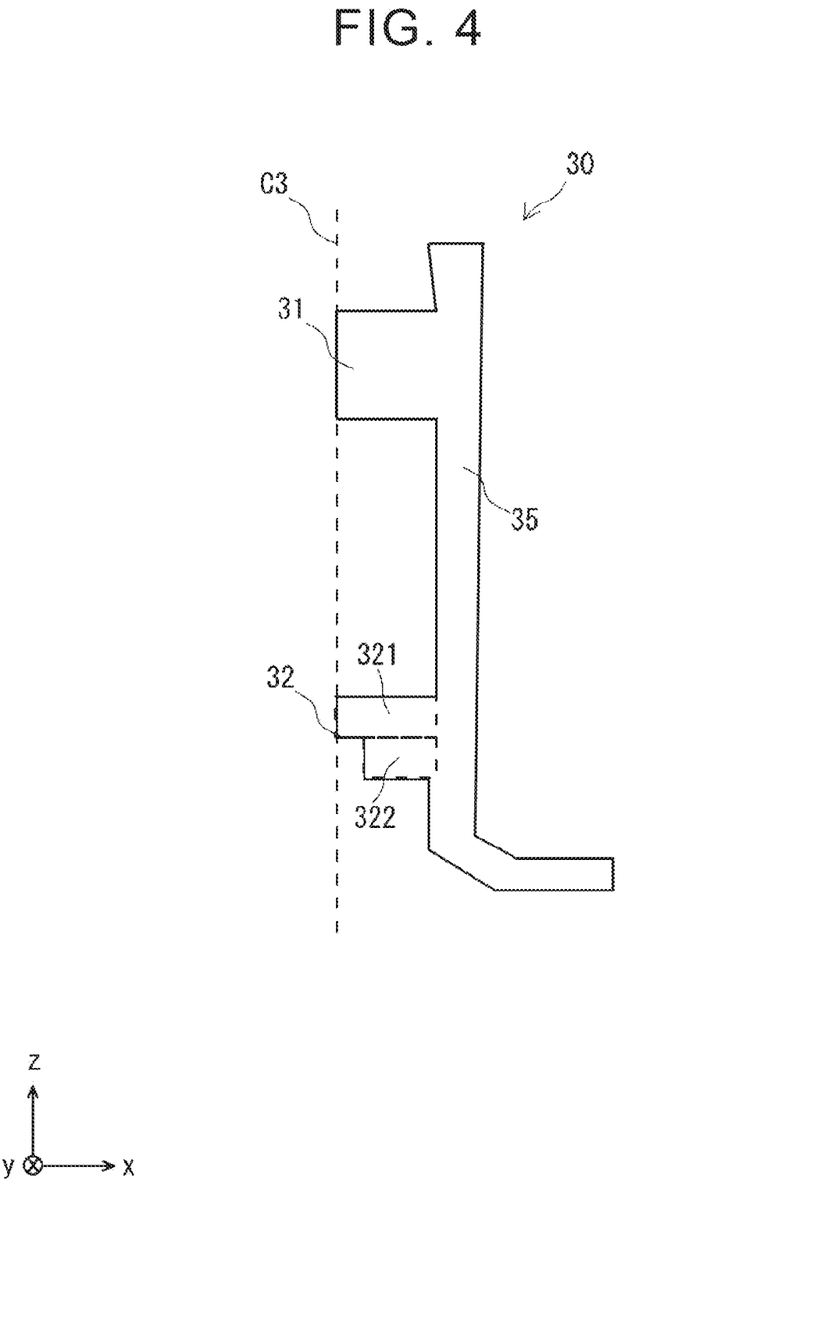
FIG. 4 is a view showing a part of a case of a transaxle according to a modification.

Next, a transaxle according to a modified example will be described. FIG. 4 is a diagram illustrating a part of a case of a transaxle according to a modification. In the transaxle 30 according to the modification, the configurations of the first boss portion and the second boss portion are different from those of the transaxle 20, and other configurations are the same. Therefore, the first boss portion and the second boss portion will be described with attention.

The case 35 of the transaxle 30 includes a first boss portion 31 and a second boss portion 32. The first boss portion 31 protrudes toward the vehicle member 60 side and is provided upward side (on the positive z-axis direction side) on a surface on which the vehicle member 60 bent under the collision load abuts. The second boss portion 32 protrudes toward the vehicle member 60 side and is provided downward side (on the z-axis negative direction side) on a surface on which the vehicle member 60 bent under the collision load abuts.

As illustrated in FIG. 4, in the transaxle 30, the upper portion 321 of the second boss portion 32 protrudes toward the vehicle member side from the lower portion 322. More specifically, the distal end portion of the upper portion 321 of the second boss portion is located on the reference line C3. On the other hand, the distal end portion of the lower portion 322 of the second boss portion is located closer to the x-axis positive direction than the reference line C3. Further, the distal end portion of the first boss portion 21 is located on the reference line C3.

As described above, in the transaxle 30, the length of the upper portion 321 of the second boss portion 32 protruding from the case 35 is longer than the length of the lower portion 322 of the second boss portion 32 protruding from the case 35. In other words, in the transaxle 30, the second boss portion 32 has a stepped shape. The length of the first boss portion 31 protruding from the case 35 is the same as the length of the upper portion 321 of the second boss portion protruding from the case 35.

The abutting point between the transaxle 30 and the vehicle member 60 when the vehicle collides will be described. As shown in FIG. 4, the first boss portion 31 and the upper portion 321 of the second boss portion protrude toward the vehicle member 60 side from the lower portion 322 of the second boss portion. Accordingly, the vehicle member 60 abuts the upper portion 321 of the second boss portion before the lower portion 322 of the second boss portion. Therefore, it is possible to prevent the stress from concentrating on the lower portion 322 of the second boss portion 32, and thus it is possible to prevent the case 35 from being broken.

As described above, in the transaxle 30, the upper portion 321 of the second boss portion protrudes toward the vehicle member 60 side from the lower portion 322 of the second boss portion. Accordingly, since the vehicle member 60 abuts against the upper portion 321 of the second boss portion before the lower portion 322 of the second boss portion, it is possible to save space and suppress cracking of the case.

Note that the shape of the upper portion 321 of the second boss portion 32 is not limited to the example shown in FIG. 3, and at least a portion of the upper portion 321 may protrude from the lower portion 322. That is, the shape of the upper portion 321 of the second boss portion may be any shape that abuts against the vehicle member 60 before the lower portion 322 of the second boss portion 32.

Transaxle According to a Modification

Figure 5:
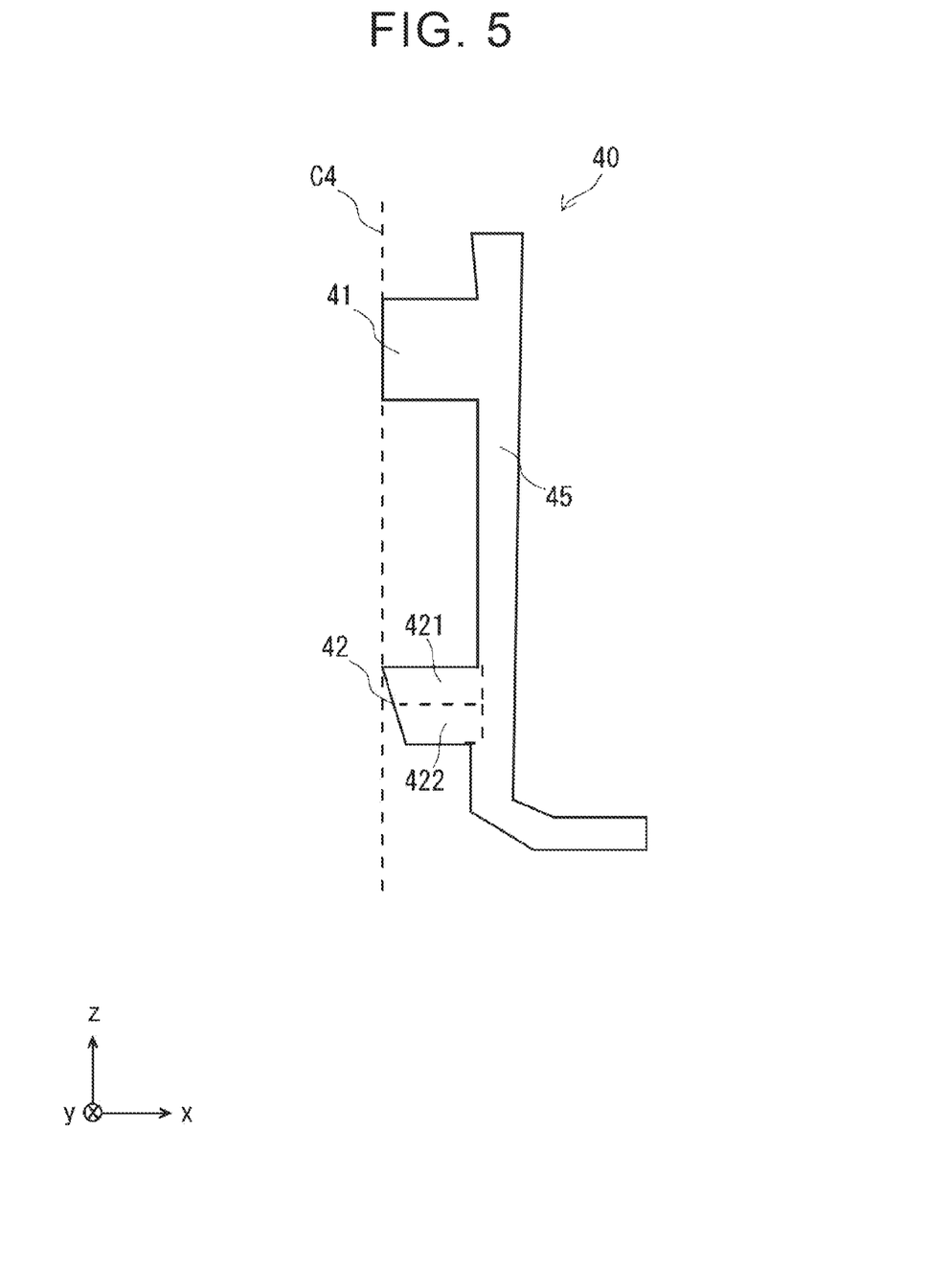
FIG. 5 is a view showing a part of a case of a transaxle according to another modification.

Next, a transaxle according to another modification will be described. FIG. 5 is a view illustrating a part of a case of a transaxle according to another modification. In the transaxle 40 according to another modification, the configuration of the second boss portion is different from that of the transaxle 30, and the other configurations are the same. Therefore, a description will be given focusing on the second boss portion.

As shown in FIG. 5, in the transaxle 40, the second boss portion 42 has a tapered shape that protrudes toward the upward side (the z-axis positive direction side). More specifically, the upward side end portion of the upper portion 421 of the second boss portion 42 is located above the reference line C4. On the other hand, the downward side end portion (the z-axis negative direction side) of the lower portion 422 of the second boss portion 42 is located closer to the x-axis positive direction side than the reference line C4. That is, the second boss portion 42 has a tapered shape with a negative inclination from the upward side end portion of the upper portion 421 to the downward side end portion of the lower portion 422 in xz plan view. Further, the distal end portion of the first boss portion 41 is located on the reference line C3.

As described above, in the transaxle 40, the length of the second boss portion 32 protruding from the case 45 increases as approaching the upward side (the positive z-axis direction side). The length of the first boss portion 41 protruding from the case 45 is the same as the length of the upper portion 421 protruding from the case 45 above the tip portion upward side (on the positive z-axis direction side).

The abutting point between the transaxle 40 and the vehicle member 60 when the vehicle collides will be described. As shown in FIG. 4, the second boss portion 42 has a tapered shape protruding toward the upward side (the positive z-axis direction side). Accordingly, the vehicle member 60 abuts the upper portion 421 of the second boss portion before the lower portion 422 of the second boss portion. Therefore, it is possible to prevent the stress from concentrating on the lower portion 422 of the second boss portion 42, and thus it is possible to prevent the case 45 from being broken.

As described above, in the transaxle 40, the second boss portion 42 has a tapered shape protruding toward the upward side (the z-axis positive direction side). Accordingly, since the vehicle member 60 abuts against the upper portion 421 of the second boss portion before the lower portion 422 of the second boss portion, it is possible to save space and suppress cracking of the case.

As described above, in the transaxles 20, 30, and 40, the vehicle member 60 abuts the upper portion of the first boss portion or the second boss portion before the lower portion of the second boss portion. With such a configuration, space saving and cracking of the case can be suppressed.

The transaxles 20, 30, and 40 control the position of the stress concentration so that the pressure does not concentrate on the lower portion of the second boss portion. As described above, the transaxles 20, 30, and 40 change the shape of the first boss portion or the second boss portion that abuts the vehicle member, and the position of the stress concentration is controlled, so that the space saving and the cracking of the case can be suppressed.

In addition, the transaxles 20, 30, and 40 only change the shape of the first boss portion or the second boss portion that abuts the vehicle member. In addition, the transaxles 20, 30, and 40 can be implemented in a space-saving manner, and thus can be mounted on any type of vehicle, such as a hybrid electric vehicle or a hydrogen-engine vehicle.

It is to be understood that, similarly to the transaxle including the first boss portion 21 of the transaxle 20 and the second boss portion 32 of the transaxle 30, it is possible to save space and suppress cracking of the case. In addition, the transaxle including the first boss portion 21 of the transaxle 20 and the second boss portion 42 of the transaxle 40 can also save space and suppress cracking of the case.

Embodiment 2

Transaxle

Figure 6:
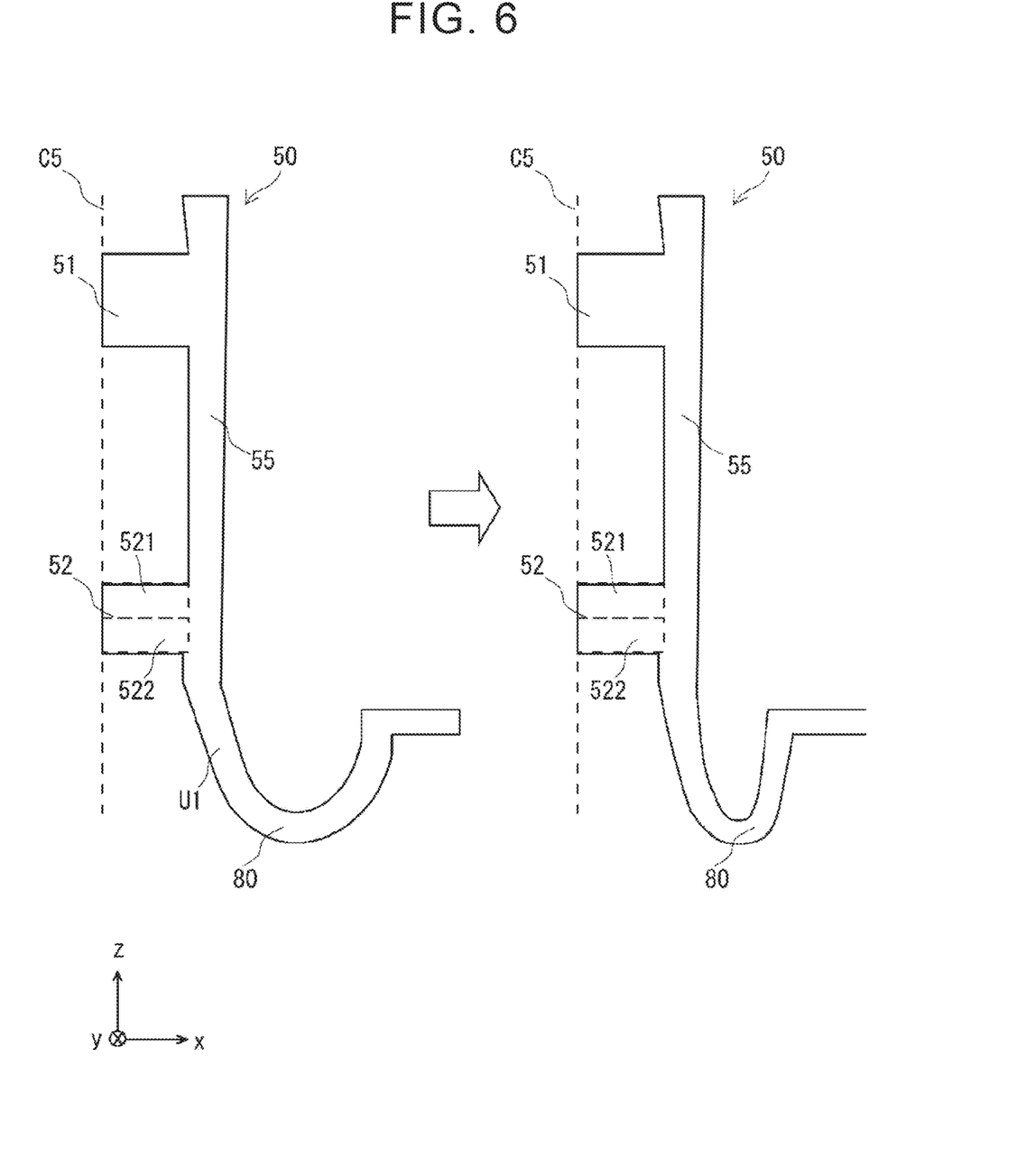
FIG. 6 is a diagram illustrating a part of a case of the transaxle according to the second embodiment.

A transaxle according to a second embodiment will be described. FIG. 6 is a diagram illustrating a part of a case of the transaxle according to the second embodiment. Although not shown in FIG. 6, the transaxle 50 according to the second embodiment houses at least the rotating electrical machine 13 and the gear 14 in the case 15, similarly to the transaxle 10 according to the comparative example shown in FIG. 1.

FIG. 6 shows before and after deformation of the transaxle 50 when the vehicle collides. The left side of FIG. 6 shows the transaxle 50 before the vehicle collision, and the right side of FIG. 6 shows the transaxle 50 after the vehicle collision.

Since the first boss portion 51 and the second boss portion 52 of the transaxle 50 are the same as the first boss portion 11 and the second boss portion 12 of the transaxle 10 according to the comparative example shown in FIG. 1, the description thereof will be omitted. Here, a description will be given focusing on the relieving portion 80.

When the vehicle member 60 (see FIG. 1) abuts the second boss portion 52, the relieving portion 80 is pushed by the vehicle member 60 to relax the impact. In the example illustrated in FIG. 6, the relieving portion 80 is configured to be bent in the x-axis direction with low rigidity.

The relieving portion 80 is not limited to the U-shaped shape shown in FIG. 6, and may be any shape capable of bending in the x-axis direction. The relieving portion 80 is preferably made of a material having a low Young's modulus. Further, as shown in FIG. 6, the relieving portion 80 is preferably provided downward side the second boss portion 52 (on the z-axis negative direction side), but is not limited thereto. The relieving portion 80 may be provided downward side the second boss portion 52 (on the z-axis negative direction side) and upward side the first boss portion 51 (on the z-axis positive direction side).

The transaxle 10 shown in FIG. 2 is compared with the transaxle 50 shown in FIG. 6. As described above, in the transaxle 10 illustrated in FIG. 2, the root portion G1 has low stiffness and large deformation during impact. The corner portion G2 has high stiffness and is less deformed during impact. Accordingly, when the transaxle 10 illustrated in FIG. 2 abuts against the vehicle member 60, the stress is concentrated on the lower portion 122 of the second boss portion 12 rather than the upper portion 121 of the second boss portion 12. Then, stresses are concentrated on the root portion G1. As a result, the case 15 is broken.

On the other hand, in the transaxle 50, when the vehicle collides, the lower portion 522 of the second boss portion 52 abuts the vehicle member 60, similarly to the transaxle 10 according to the comparative example shown in FIG. 2. The lower portion 522 of the second boss portion 52 is pushed toward the x-axis positive direction side while maintaining the state of abutting the vehicle member 60.

The relieving portion 80 deflects in the x-axis direction as the lower portion 522 of the second boss portion 52 is pushed by the vehicle member 60. That is, the relieving portion 80 deflects in the x-axis direction as shown in the state from the left side in FIG. 6 to the right side in FIG. 6. As a result, it is possible to prevent the stress from being concentrated on the lower portion 522 of the second boss portion 52, and thus it is possible to prevent the case 55 from being broken.

As described above, the transaxle 50 includes the relieving portion 80 that relaxes the impact by being pushed by the vehicle member when the vehicle member abuts against the second boss portion 52. As a result, it is possible to prevent stress from concentrating on the lower portion 522 of the second boss portion 52, thereby saving space and suppressing cracking of the case 55.

The present disclosure is not limited to the above-described embodiment, and can be appropriately modified without departing from the scope of the present disclosure.

What is claimed is:

1. A transaxle, comprising
a case that houses at least a rotating electrical machine and a gear, the case including a first boss portion and a second boss portion on a face that a vehicle member bent under a collision load abuts, wherein
the first boss portion protrudes toward a side of the vehicle member and is provided on an upward side with respect to the second boss portion,
the second boss portion protrudes toward the side of the vehicle member and is provided on a downward side with respect to the first boss portion such that the vehicle member abuts the first boss portion or an upper portion of the second boss portion before a lower portion of the second boss portion, and
at least a part of the upper portion of the second boss portion protrudes further than the lower portion of the second boss portion.

2. A transaxle, comprising
a case that houses at least a rotating electrical machine and a gear, the case including a first boss portion and a second boss portion on a face that a vehicle member bent under a collision load abuts, wherein
the first boss portion protrudes toward a side of the vehicle member and is provided on an upward side with respect to the second boss portion,
the second boss portion protrudes toward the side of the vehicle member and is provided on a downward side with respect to the first boss portion such that the vehicle member abuts the first boss portion or an upper portion of the second boss portion before a lower portion of the second boss portion, and
the second boss portion is tapered such that, the closer to the upward side, the farther the second boss portion protrudes.

* * * * *